Aug. 19, 1930. W. J. MADDOX 1,773,466
RUBBING, SANDING, AND POLISHING MACHINE
Filed June 20, 1925 5 Sheets-Sheet 1

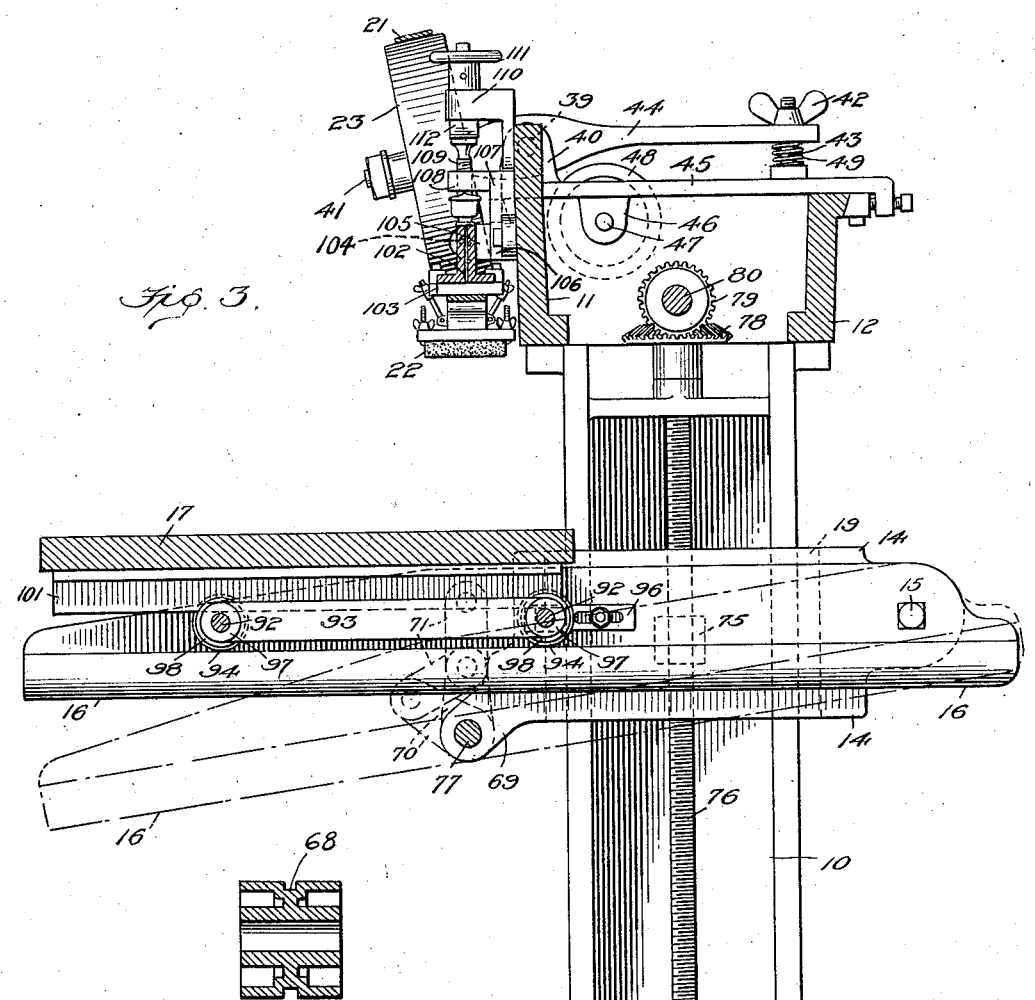
Fig. 3.
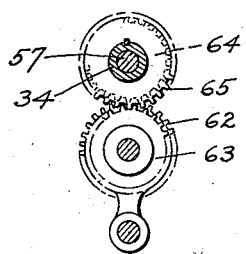
Fig. 12.
Fig. 13.

Aug. 19, 1930.  W. J. MADDOX  1,773,466
RUBBING, SANDING, AND POLISHING MACHINE
Filed June 20, 1925   5 Sheets-Sheet 4
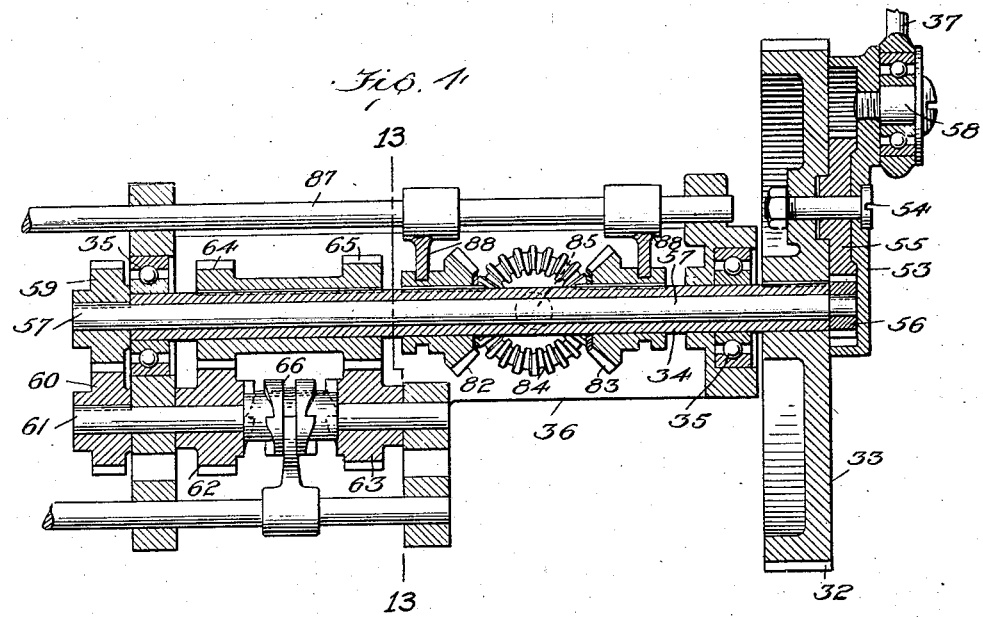
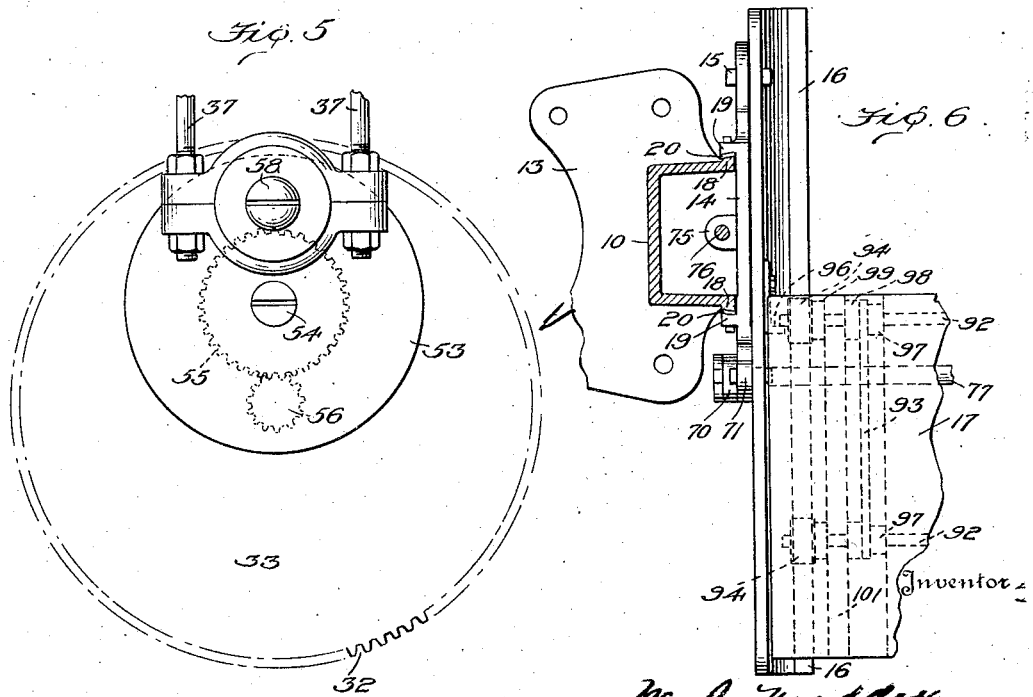

Aug. 19, 1930. W. J. MADDOX 1,773,466
RUBBING, SANDING, AND POLISHING MACHINE
Filed June 20, 1925 5 Sheets-Sheet 5
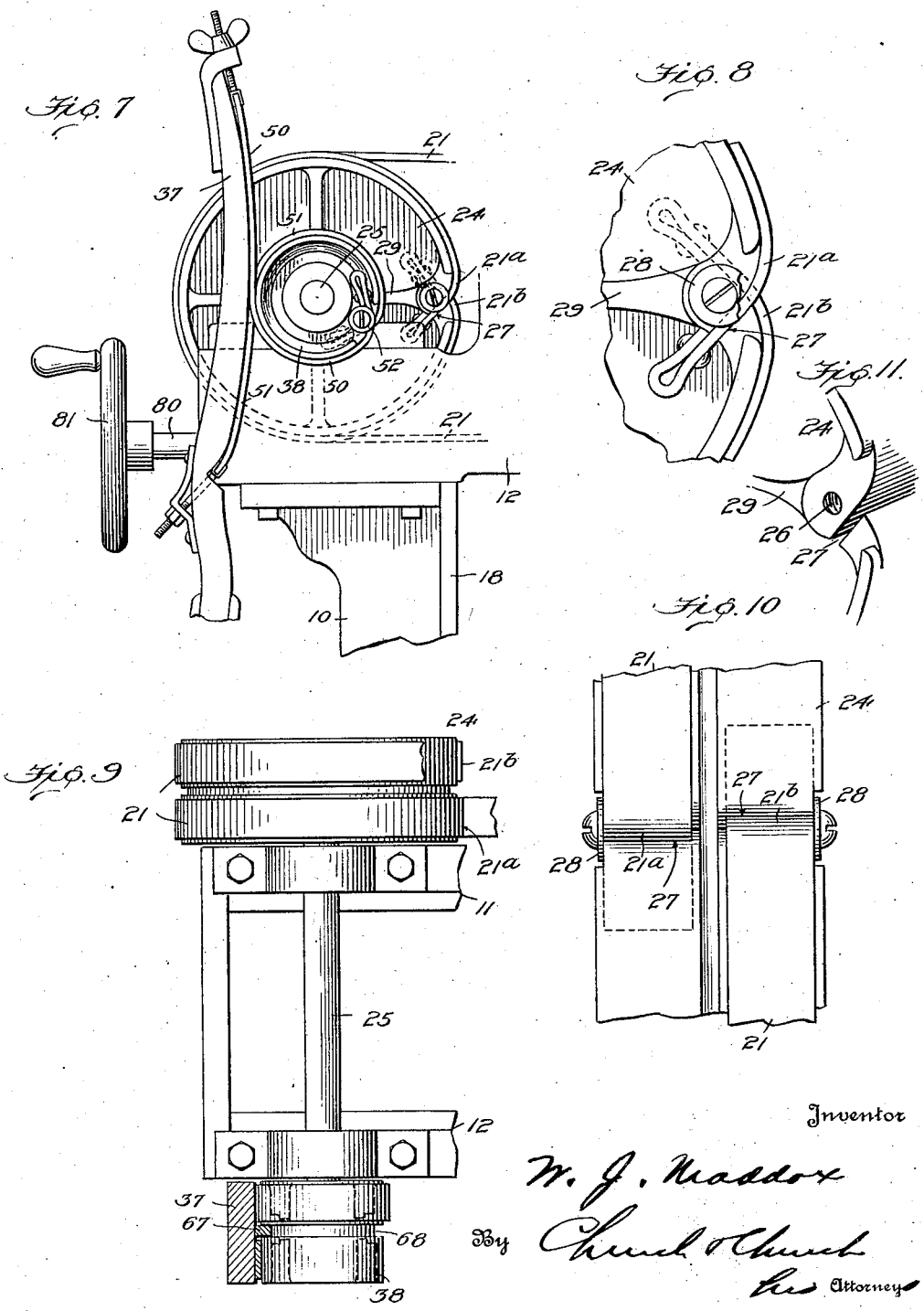

Patented Aug. 19, 1930

1,773,466

UNITED STATES PATENT OFFICE

WILLIAM J. MADDOX, OF JAMESTOWN, NEW YORK

RUBBING, SANDING, AND POLISHING MACHINE

Application filed June 20, 1925. Serial No. 38,455.

This invention relates to improvements in machines that have gone into quite general use for rubbing, sandpapering or polishing surfaces of wood, stone and metal, and while the machine illustrated is particularly adapted for working on plane surfaces, features of the present invention may be readily utilized for working on curved surfaces as will be apparent to those skilled in the art.

Machines of this type are described and illustrated in my prior Patents, No. 650,407, dated May 29, 1900, and No. 668,533, dated February 19, 1901, and an object of the present invention is to simplify the mechanical construction of the operating parts of the machine and to provide a machine having a wider range of utility than heretofore.

In this simplification of construction of the machine, the operating parts have been so arranged and co-ordinated that they are all capable of being actuated by a single motor carried on the machine frame, so that the machine, as shipped by the manufacturer, is a complete working unit.

As is well known in the art, machines of this character have one or more rubbers or other tools carried on a reciprocatory member, usually a belt, that extends over or across a work support, and to increase the capacity of the machines they have generally been equipped with a belt reciprocating mechanism that can be adjusted to vary the degree of reciprocation of the belt. To the same end, they have also been so constructed that the work support could be adjusted toward and from the rubber and the belt on which said rubber is carried. Mechanisms having similar functions are also embodied in the present machine, but the mechanisms contemplated by this invention have been devised with the idea of making them operable by power derived from the motor which is also used for reciprocating the belt. In addition said mechanisms have been so arranged in the present machine that the work support may be raised or lowered through said motor without interrupting the movement of said belt and the extent of movement of said belt may likewise be mechanically varied without stopping its reciprocatory motion.

With these and other objects in view, the invention consists in certain novel details of construction and combinations and arrangements of parts, all as will hereinafter be more fully described and the novel features thereof particularly pointed out in the appended claims.

In the accompanying drawings,—

Fig. 3 is a sectional view on the line 3—3 of Fig. 1, looking in the direction indicated by the arrows.

Fig. 4 is a sectional view of the motor operated connections for varying the extent of reciprocation of the belt on which the rubber is carried;

Fig. 5 is an end view, taken from the right hand end of Fig. 4, the crank wheel being shown in dot and dash lines;

Fig. 6 is a horizontal sectional view on the line 6—6 of Fig. 1;

Fig. 7 is a side view of the upper portion of the pitman and the rocker member for imparting the reciprocatory motion to said belt;

Fig. 8 is a somewhat enlarged view illustrating the connection between the pitman and rocker member;

Fig. 9 is a top plan view of the parts shown in Fig. 7, the pitman being shown in section;

Fig. 10 is an edge view of the structure illustrated in Fig. 8;

Fig. 11 is a perspective view of a portion of the rocker member to more clearly illustrate the way in which the pitman is connected to said member.

Fig. 12 is a detail sectional view of the small pulley shown in Fig. 9.

Fig. 13 is a detail sectional view on the line 13—13 of Fig. 4.

Figure 1:
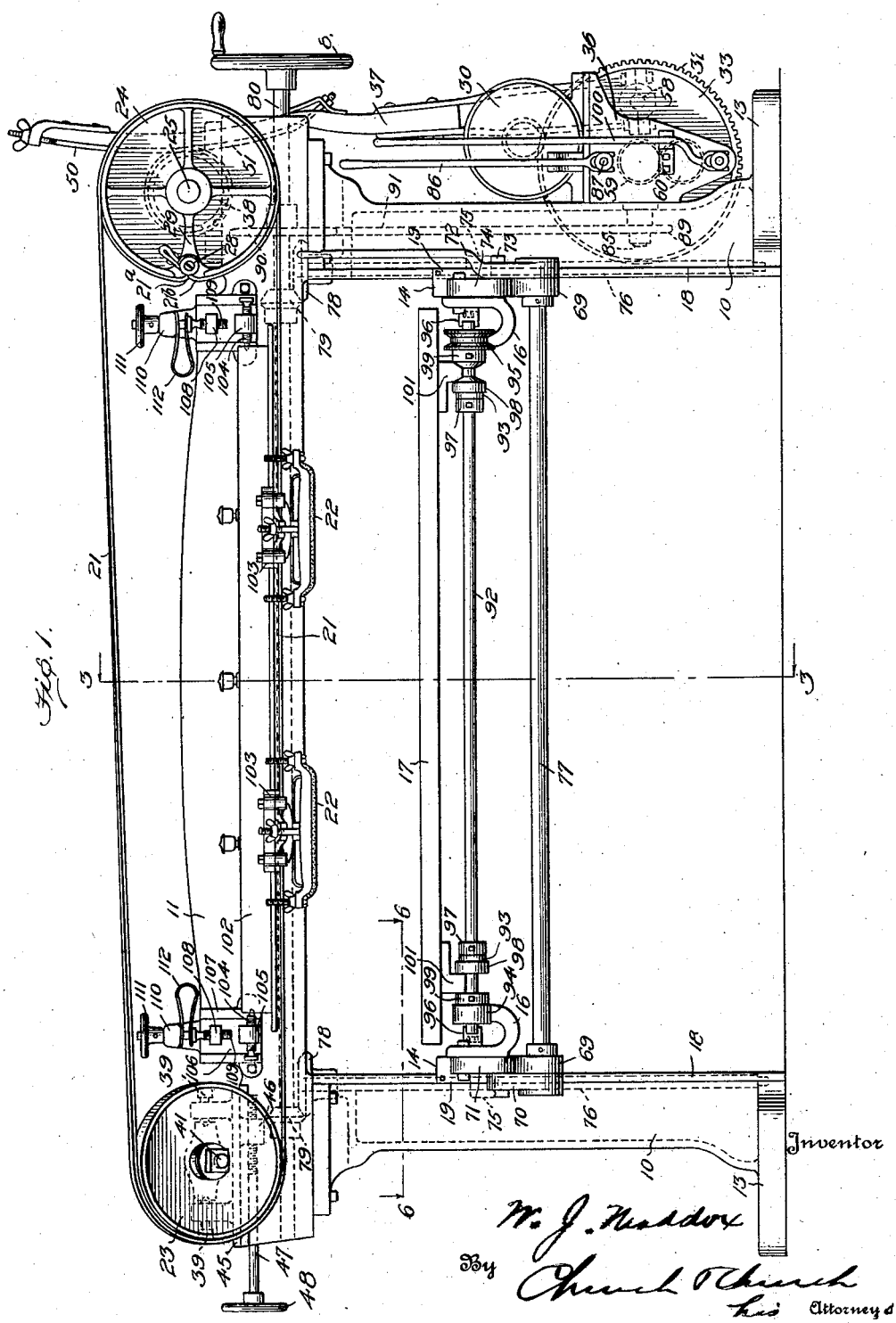
Figure 1 is a front elevation of a machine embodying the present invention, the several features being shown in their preferred form.

In its preferred construction, the machine frame is composed of standards 10, the space between the standards being bridged by front and rear frame members 11, 12, mounted on the upper ends of said standards. The standards 10 are located at opposite ends of the frame and have an enlarged base 13 for anchoring them to the floor and for convenience, as well as for imparting strength to said standards, they may be channel-shaped in cross-section. Slidably secured on each standard is a bracket 14, and to each of said brackets there is pivotally secured, as at 15, a track member 16, the tracks at opposite ends of the frame constituting a runway for a work-supporting table or platform 17. Said brackets 14 may be slidably attached to the standards 10 as by forming the arms of the channels with beveled, outwardly disposed flanges 18 with which corresponding flanges 19 on said brackets co-operate, shims 20 being interposed between the surfaces of said flanges to compensate for clearance that may be found desirable for purposes of assembly.

Above the work-table 17, is a reciprocatory belt or other tape-like member 21 on which is secured one or more rubbers or similar tools 22 which are adapted to be moved back and forth over the surface of the material being treated, that is, rubbed, sandpapered, or polished. In the present invention, said tools 22 are carried on the lower reach of belt 21, the intermediate portion of said belt being passed around a pulley 23 loosely journaled adjacent one end of the table 17 and frame and the ends thereof secured to a pulley 24 mounted on the forward end of a transverse shaft 25 journaled in frame members 11, 12. It will be observed that the entire belt is located above the work table 17 and in order that the pulleys 23, 24 may accommodate said belt, loose pulley 23 is arranged at an angle to the plane of rotation of pulley 24 and the latter is made of increased width corresponding to substantially twice the width of the belt. A convenient and secure method of attaching the belt ends to pulley 24 is illustrated in Figs. 7, 8, 10 and 11. As shown, the pulley may have a central web on each side of which there are a plurality of spokes, and one spoke 29 on each side of said web has a threaded socket 26 therein. The ends 21ª and 21ᵇ extend around the pulley in opposite directions, the end portion 21ª extending through a transverse slot 27 in spoke 29 and the end 21ᵇ extending through a similar slot in the corresponding spoke on the other side of the central web, said slots extending through the periphery of the pulley. Each end is doubled back upon itself and fastened, as by rivets, to prevent lengthwise withdrawal of the belt through slot 27 and, as each slot is open at the side of the pulley to permit lateral insertion of the belt after said end has been doubled back, a bolt, carrying a washer 28, is turned home in the threaded recesses in the spokes. These washers 28 overlie the open sides of slots 27 and prevent accidental displacement of belt end in a lateral direction.

In order that the inclination of pulley 23 may be varied said pulley is loosely mounted on a shaft 41 formed on a T-shaped member 44 pivotally supported on pins 39 which are carried in brackets 40 on a slide 45 supported in the machine frame. The rear end of said member 44 is vertically adjustable by a butterfly nut 42 that can be screwed down on a post 43 which projects loosely through said member. Said post is mounted on the slide and a spring 49 surrounding said post yieldingly urges the rear end of member 44 upwardly. By moving the nut 42 on said post, the shaft 41, which is slightly offset with respect to member 44, may be raised or lowered to vary the inclination of the pulley 23 with respect to pulley 24. The slide 45 has a threaded projection 46 into which is screwed a threaded shaft 47 journaled in the frame and whose outer end is provided with a hand wheel 48. The tension on belt 21 can be adjusted by turning said hand wheel to move the slide 45 and pulley 23 toward or away from pulley 24.

To reduce and simplify the parts necessary to impart a reciprocatory motion to the belt 21, the present invention contemplates the use of a motor 30 that may be mounted on a shelf projecting from one of the frame standards 10. The shaft of said motor 30 has mounted thereon a pinion 31 which meshes with teeth 32 on a crank wheel 33. For purposes later appearing, crank wheel 33 is mounted on a sleeve 34 journaled in suitable bearings 35 provided in the arms of a bracket 36 carried by the standard 10. Connected eccentrically to said crank wheel 33 is a pitman 37 that projects upwardly into proximity to a rocker member or drum 38 mounted at the rear end of shaft 25 which carries the pulley 24. Two tape-like members 50, 51, or other flexible connectors are attached at one end to pitman 37 and are passed around the rocker or drum 38 side by side, in opposite directions. Said drum, like pulley 24, has a central web and a slotted spoke on each side of said web, the opposite ends of said connectors 50, 51 being received in said slotted spokes and secured therein by doubling said ends and applying washers 52 and bolts to said spokes. This is the same arrangement as used for securing the ends of belt 21 in pulley 24 and no further description is deemed necessary. It is believed the oscillation of rocker 38 and pulley 24 and the consequent reciprocation of belt 21 will be understood from the foregoing. Suffice it to say, that as pitman 37 moves upward (see Fig. 7) belt 50 will tend to unwrap itself off of the rocker, thus turning the rocker in a clockwise direction, and as said pitman descends, belt 51, which, at that time, will be either partly or wholly wrapped around the rocker (depending on the throw given the pitman), will turn the rocker in the reverse direction. During this reverse rotation, belt 50 will again be wrapped around the rocker so that the direction of rotation of the rocker will again be reversed on the succeeding upward movement of pitman 37.

Because of the varying areas of the surfaces to be operated upon, it is, of course, necessary to provide means for correspondingly varying the extent of reciprocation of the belt 21 and tools carried thereby. Such mechanisms have been provided in different prior structures, but in most instances, if not all, it has been necessary to stop the machine to make the adjustment. In the present construction, however, this adjustment may be made without stopping the machine and, in fact, such adjustment is preferably performed with power derived from motor 30 that, as before described, actuates the crank wheel 33 and pitman 37. In the preferred arrangement for accomplishing this object (see Fig. 4), the end of pitman 37 adjacent the crank wheel is not directly attached to said wheel but is, on the contrary, pivoted by a pin 58 on a disk 53 carried by a bolt 54 which extends through the crank wheel. Also carried by said bolt, but firmly attached to said disk 53 is a gear 55 with which meshes a pinion 56 mounted on an end of a shaft 57 extending through the sleeve 34 on which said crank wheel is mounted. At its opposite end, shaft 57 carries a gear 59 adapted to mesh with a gear 60 on a stub shaft 61 journaled in arms of bracket 36, and loose on said stub shaft is a pair of gears 62, 63 meshing with a second pair of gears 64, 65, mounted on the sleeve 34 carrying the crank wheel.

So long as gears 62, 63 idle on said stub shaft 61, there will be no relative movement of the gear 55 and pinion 56, the latter rotating at the same speed at which the former is carried around the center of the crank wheel. As illustrated in Fig. 5, the pivot 58 is located in its remotest position with respect to the center of crank wheel 33, under which circumstances the maximum reciprocatory motion will be imparted to belt 21. In order that this stroke may be varied, however, gear 64 is made smaller than gear 62, a difference of one tooth being sufficient and likewise gear 63 on stub shaft 61 is made smaller than gear 65. By clutching in, say larger gear 62 on stub shaft 61, said shaft will be rotated at a speed slower than sleeve 34 and wheel 33, and by reason of gears 60, 59, pinion 56 will be held to a speed corresponding to that of shaft 61. For this reason, pinion 56 will be held back, so to speak, with respect to the bodily movement of gear 55, resulting in said gear 55 and the disk 53 to which pitman 37 is pivoted being turned on bolt 54 in a counter-clockwise direction, thereby moving the pivotal connection of the pitman in toward the center of the crank wheel. This movement would, of course, continue so long as the gear 62 is clutched to stub shaft 61. Consequently, when the center of the pitman connection has been moved inwardly to the proper position, clutch 66 is disengaged from gear 62.

Figure 2:
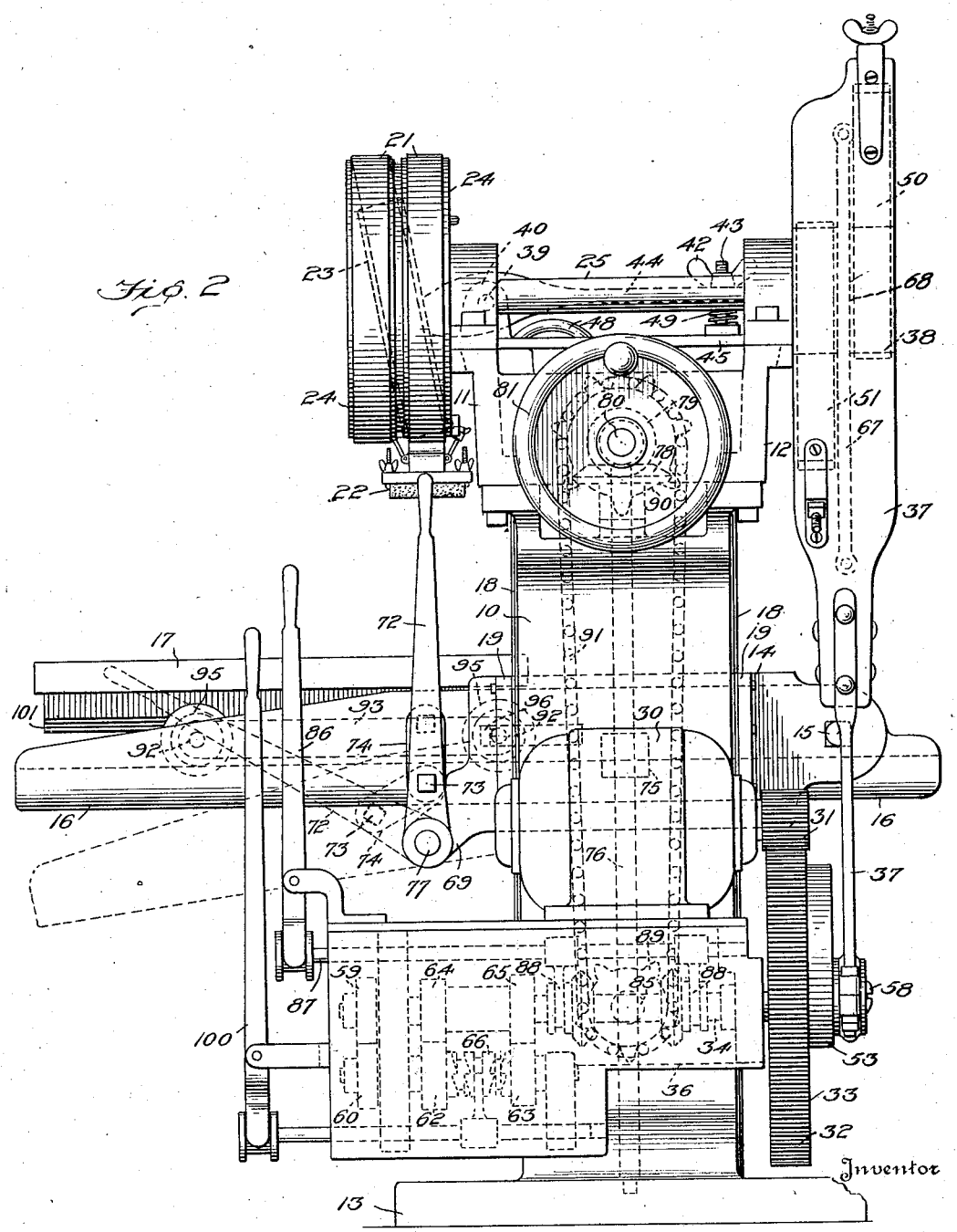
Fig. 2 is an elevation of the right hand end of the machine illustrated in Fig. 1, some of the parts located behind the end frame, etc., being shown in dotted lines.

Should the pitman connection be relatively near to the center of the crank wheel and it should be desired to move said connection outward, thereby increasing the throw of the pitman, clutch 66 is moved into engagement with gear 63 which is smaller than gear 65 on sleeve 34. With these gears in mesh, the shaft 56 of pinion 56 will rotate faster than sleeve 34 and the crank wheel and thereby cause disk 53 to rotate in a clockwise direction to move the pivotal connection of the pitman outward toward the periphery of the crank wheel. Clutch 66 is operable by a clutch lever 100 at the front of the machine. (See Fig. 2.)

It might here be stated that the outer extremity of pitman 37 has a guide 67 thereon which works in a guide slot 68 formed in the rocker member 38 so as to prevent any lateral movement of said pitman with respect to the rocker.

It is sometimes desirable and convenient to tilt the work support or table 17 and to this end, the sliding brackets 14, to which the track members 16 are pivoted, are formed with extensions 69 (see Fig. 3) supporting a longitudinal shaft 77 at one end of which there is secured a link 70 having pivotally connected thereto a second link 71 which, in turn, is pivoted to the adjacent track member 16. At the opposite end of the machine on shaft 77, there is mounted a hand lever 72 and pivoted to said lever at 73 is a link 74 which, like link 71, is pivoted to adjacent track member 16. The work support 17 is shown in horizontal position in Figs. 2 and 3, but by pulling lever 72 to the left, as shown in dotted lines in the drawings, links 71, 74 will be moved to the positions indicated in dotted lines in said figures, thereby dropping or lowering the forward edge of the support.

It is also desirable to have the work support bodily movable toward and away from the rubbers 22, either to accommodate relatively large bodies between said support and rubbers or to facilitate placing large bodies on and removing them from said support. For this reason the brackets 14 have lugs 75 formed thereon which lugs have threaded apertures for co-operation with vertically disposed screw-threaded shafts or posts 76 journaled at their lower ends in the bases 13 of the standards. At their upper extremities, said shafts 76 are provided with bevel gears 78, the two gears meshing with similar gears 79 on a longitudinally extending shaft 80 journaled in the frame. By rotating shaft 80 and shafts 76 the brackets 14 and tracks 16, carrying the work support are movable upward or downward on said shafts 76, depending upon the direction of rotation of the shafts.

Shaft 80 may be operated by a hand wheel 81 located, for instance, at the end of the frame, but, if desired, said shaft may be driven by power derived from the motor 30. The preferred connections for accomplishing this, comprise sleeve 34 which carries two slidable bevel gears 82, 83 movable into and out of mesh with a bevel gear 84 on a shaft 85. Said gears 82, 83 are shown in neutral position in Fig. 4, but, as stated, either one may be moved into engagement with gear 84 by a lever 86 at the front of the machine, said lever being adapted to reciprocate a rod 87 on which are mounted collars 88 connected to gears 82, 83. Mounted on shaft 85 is a sprocket wheel 89 and on shaft 80 is a second sprocket 90, the two sprockets being connected by a sprocket chain 91, whereby, when gear 84 is engaged by either of gears 82, 83, the sprockets and shaft 80 will be rotated in either one or the other direction, depending upon which of said gears is in engagement with gear 84. As will be noted, these motor driven connections for raising or lowering the work support are operable without interfering with the operation of belt 21.

Another feature contemplated by the present invention consists in an arrangement whereby an increased or differential movement of work support 17 is secured. In said arrangement a carriage for said support is interposed between the support proper and the tracks 16, said carriage being movable along the tracks and the support being movable with respect to the carriage so that the distance traveled by the support will be in excess of that traveled by the carriage. As a convenient and simple construction for accomplishing this result, the carriage is composed of two shafts 92 journaled in tie bars or spacer rods 93 and near their ends said shafts carry rollers 94, 95 adapted to roll on tracks 16. Rollers 95 are grooved and straddle track 16 to prevent lateral play or movement of the carriage on the track and the ends of said shafts project beyond the rollers so as to engage a stop 96 on track member 16 at the extremes of movement of the carriage. The tie rods 93 are positioned between collars 97, 98 on shafts 92 and spaced from each collar 98 is another collar 99, these spaced collars 98, 99, forming grooves or guideways in which are received guides 101 on the bottom of the work support. The table or support 17 rests loosely on the shafts 92 between said collars and, as will be understood, when the carriage moves along tracks 16 and shafts 92 turn, the support will not only be carried bodily by the carriage, but it will also roll on the revolving shafts, thus imparting to it a greater travel transversely of the belt than that had by the carriage. The support proper may be supported on the carriage in any desired way, two forms of collars and guides being shown in Fig. 1. At the right hand end of the frame, adjacent faces of collars 98, 99 diverge and the sides of guide 101 are beveled, whereas the adjacent faces of the collars at the left end of the machine are parallel and the sides of the guide on the support are likewise parallel.

In so far as the rubbers or other tools 22 are concerned, it suffices to say that they may be of any desired construction. They are adapted to slide freely on a cross bar or guide 102 mounted on the frame, their sliding movement being imparted to them by belt 21 to which they are clamped. A detail description of a rubber is to be found in my prior Patent No. 668,533, heretofore referred to.

In the preferred construction, as shown in Figs. 1 and 3, the top plate 103 of each rubber embraces the guide bar 102 and the latter is suspended from pins 104 threaded through lugs 105 on plates 106 which are slidable in ways formed in plates 107 bolted to the front of side frame 11 adjacent the ends of the machine. The sliding plates 106 also have threaded lugs 108 which receive the threaded portions of shafts 109 that extend loosely through apertures in an overhanging portion 110 of the fixed plates 107. The upper ends of shafts 109 project above said overhanging portion and have fastened thereon heads 111, said slides and the cross bar suspended therefrom, actually being supported by the heads 111 engaging the overhanging portions 110 of the fixed plates 107. A spring 112 is interposed between overhanging portions 110 and offsets on shafts 109 to yieldingly hold the cross bar down, but, shafts 109 being loose in portions 110, the entire bar is free to rise and fall to accommodate any undulations in the surface of the article being operated upon. Furthermore, cross bar being suspended from pins 104, it is permitted a slight rocking movement transversely of the direction of normal movement of belt 21 and the rubbers. By turning heads 111 and shafts 109 in one direction or the other, the slides themselves may be adjusted vertically to vary the pressure exerted by the rubbers on the surface being rubbed.

As is best illustrated in Fig. 1, all of the major operating parts are located at the end of the machine beyond the boundaries of the work support, there being no obstructions of any nature to prevent lowering said support to substantially the floor level. This increased clearance below the support is a great convenience when moving heavy articles on or off the support and also permits large articles to be accommodated by the machine.

I claim:

1. In a rubbing machine, the combination of a frame, a work support, a pulley journaled near one end of the work support, a shaft journaled near the opposite end of the work support, a double pulley mounted on said shaft, means for rocking said shaft and oscillating said double pulley, a belt extending around the loose pulley and having its ends secured to and extending in reverse directions around the double pulley, said loose pulley being disposed at an angle to the plane of rotation of the double pulley whereby the end portions of said belt may lie side by side on the double pulley, and a rubber carried by one of the reaches of said belt.

2. In a rubbing machine, the combination of a frame, a work support, a pulley journaled near one end of the work support, a shaft journaled near the opposite end of the work support a double pulley mounted on said shaft, means for rocking said shaft and oscillating said double pulley, a belt extending around the loose pulley and having its ends secured to and extending in reverse directions around the double pulley, said loose pulley being disposed at an angle to the plane of rotation of the double pulley whereby the end portions of said belt may lie side by side on the double pulley, and means for adjusting said loose pulley to vary its inclination with respect to the plane of rotation of the double pulley.

3. In a rubbing machine, the combination of a frame, a work support, a pair of pulleys carried on said frame, a belt on said pulleys extending over the work support, a rubber on said belt, a motor, a motor driven shaft, a crank wheel on said shaft, a pitman connected to said crank wheel, connections between said pitman and one of said pulleys for imparting a reciprocatory movement to the belt, and means operable at will from said motor for varying the throw of the pitman, said means comprising a shaft rotatable within said motor driven shaft, a pinion thereon operatively associated with the connection between said pitman and crank wheel for moving the end of said pitman connected to the crank wheel toward and from the center of rotation of said wheel.

4. In a rubbing machine, the combination of a frame, a work support, an oscillatory belt extending over the support, a rubber on said belt, means for oscillating said belt comprising a motor, a motor driven shaft, a crank wheel on said shaft, a disk journaled on said wheel, a pitman connected to said disk, connections between said pitman and the belt for oscillating the latter, and means for varying the throw of the pitman, said last-mentioned means comprising a gear connected to said disk, a pinion meshed with said gear, a shaft on which said pinion is mounted, a gear on said pinion shaft, a stub shaft, a gear mounted on said stub shaft, and meshing with the gear on the pinion shaft, a pair of major and minor gears on the crank wheel shaft, a pair of major and minor gears loosely secured on said stub shaft, the major gear on the stub shaft co-operating with the minor gear on the crank wheel shaft, and the minor gear on the said stub shaft co-operating with the major gear on the crank wheel shaft, and means for making one or the other of said major and minor gears on the stub shaft fast on said shaft whereby the pinion shaft may be driven at a speed less than or in excess of the speed of the crank wheel shaft.

5. In a rubbing machine, the combination of a frame, a work support, an oscillatory belt extending over said support, a rubber on said belt, means for oscillating said belt comprising a motor, a motor driven shaft, a crank wheel on said shaft, a disk journaled eccentrically on said wheel, a pitman eccentrically connected to said disk, connections between said belt and pitman, and means for varying the throw of said pitman comprising a second shaft concentrically arranged with the first mentioned shaft and projecting beyond opposite ends thereof, a gear on one end of said second shaft, a pinion on the other end thereof, a gear attached to and concentric with said disk and engaging said pinion, and connections between the motor and said second shaft for driving the latter at speeds varying from the speed of the shaft first mentioned.

WILLIAM J. MADDOX.